Nov. 17, 1964     N. J. BOSE ETAL     3,157,872
LEVEL ENCODER
Filed Feb. 7, 1962                    3 Sheets-Sheet 1
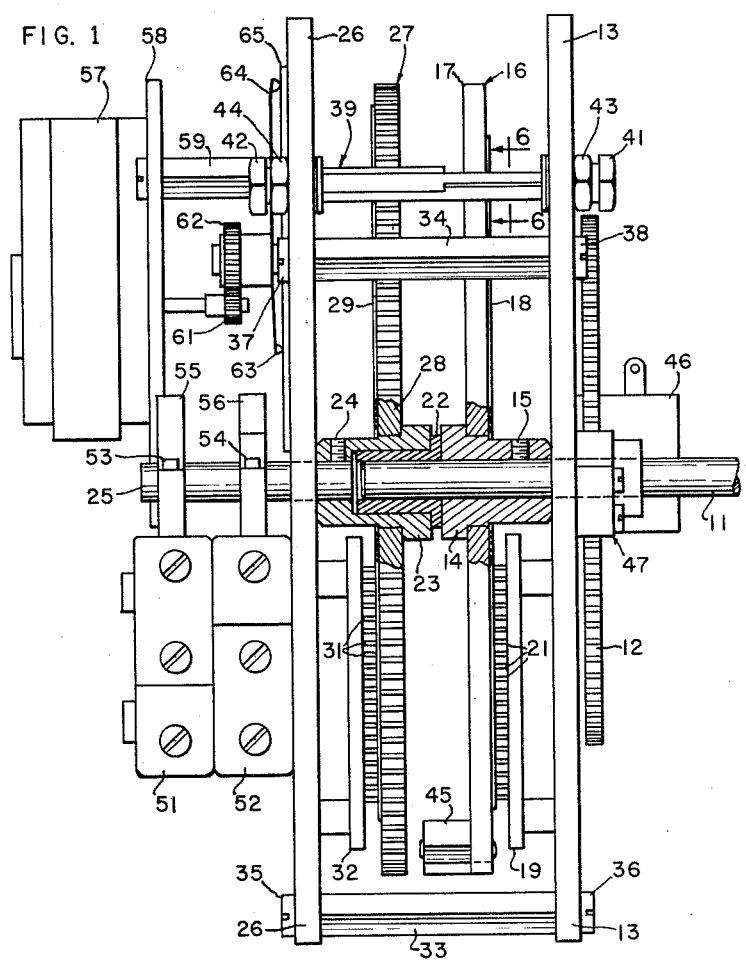
INVENTOR.
NORMAN J. BOSE
DAVID A. BREAK
BY
ATTORNEY Nov. 17, 1964   N. J. BOSE ETAL   3,157,872
LEVEL ENCODER Filed Feb. 7, 1962   3 Sheets-Sheet 2

Nov. 17, 1964  N. J. BOSE ETAL  3,157,872
LEVEL ENCODER

Filed Feb. 7, 1962  3 Sheets-Sheet 3

United States Patent Office 3,157,872
Patented Nov. 17, 1964

3,157,872
LEVEL ENCODER
Norman J. Bose, North Hollywood, and David A. Break,
La Crescenta, Calif., assignors to General Precision,
Inc., a corporation of Delaware
Filed Feb. 7, 1962, Ser. No. 171,759
1 Claim. (Cl. 340—347)

This invention relates to an analog to digital converter, and more particularly to a level encoder which is adapted to be interrogated by a field control electrical station which supplies power and electrical pulses to operate a plurality of different encoders on a tank farm.

Many different types of encoders have been built in the past, but these devices were very complex and expensive to build, requiring extremely accurate construction and close tolerances to eliminate ambiguities, or would not operate satisfactorily in the field under extreme temperature variations and other severe climatic conditions. Other devices were subject to error and were not reliable in operation.

Briefly stated, one preferred embodiment of the level encoder of the present invention consists essentially of an inch code disk which is adapted to be driven by a tape and float assembly in the tank, or other input, and a foot code disk which is driven by the inch code disk through a transfer mechanism. A locking mechanism is actuated when the level encoder is interrogated, to position both the inch and foot code disk, so that the readout brushes are approximately in the center of a segment, even though they are in an intermediate position at the time of the interrogate pulse. A stepping motor is driven by the interrogation pulses to scan a plurality of segments on a commutator which sequentially connects the readout brushes to the output to read out the level information, as determined by the position of the code disks, and transmit this information to the control station.

One object of the present invention is to provide a digital encoder which is relatively simple and inexpensive to build and is reliable and accurate in operation under severe temperature and other climatic conditions.

Other objects and many of the attendant advantages of this invention will be readily appreciated as the same becomes better understood by reference to the following detailed description when considered in connection with the accompanying drawings wherein:

FIGURE 1 is a front elevational view with portions broken away illustrating one preferred embodiment of the present invention;

Figure 6:
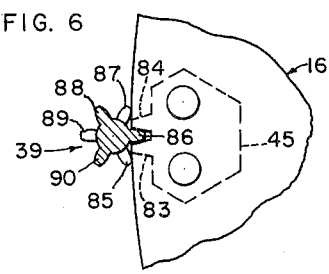
Figure 7:
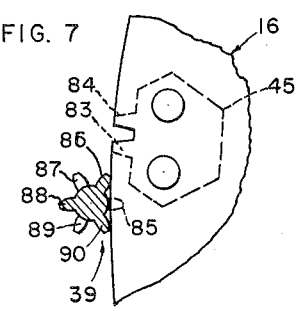

FIGURE 6 is an enlarged detail sectional view taken on the line 6—6 of FIGURE 1 illustrating the engagement of the index block on the inch wheel with the transfer pinion for moving the foot wheel by one increment for each revolution of the inch wheel, and is shown in an intermediate position during the transfer; and FIGURE 7 is a detailed view similar to FIGURE 6 showing the index block and transfer pinion before the transfer movement is started, or after it is completed.

Referring now to the drawings in detail, one preferred embodiment of the digital encoder of the present invention is shown in FIGURE 1 wherein the input shaft 11 has been broken away and may be connected to the tape and float assembly in a tank for use as a level encoder, or may be connected to any other rotatable input for use generally as a shaft position encoder.

The input shaft 11 has a gear wheel 12 mounted thereon and extends through the inner plate 13. A hub 14 is fastened to the input shaft 11 by a set screw 15 and is provided with a shoulder for mounting the coded inch wheel 16.

The inch wheel 16 is preferably formed with a rigid metal backing plate 17 and an insulating commutator surface 18 adhesively applied thereto and formed with a coded metallic pattern thereon for representing inches and sixteenths of an inch in the particular application of the present invention.

A brush block 19 is mounted on the inner plate 13 and is provided with a plurality of brushes 21 for engaging the respective tracks on the coded commutator surface 18.

The end of the input shaft 11 is mounted in a thrust bearing 22 which rotates within a collar 23 secured by a set screw 24 on a shaft 25 which extends through the outer plate 26.

The hub 23 is also provided with a shoulder for mounting the geared foot wheel 27 which also consists of a rigid backing plate 28 and a coded commutator surface 29 which is adapted to be engaged by the brushes 31 on the holder or brush block 32.

The inner and outer plates 13 and 26 are supported in spaced position by the spacer posts, such as those shown at 33 and 34, which are secured by means of the machine screws 35, 36, 37 and 38.

The gear shaft and transfer pinion 39 is also mounted for rotation between the plates 13 and 26 and is provided with adjustment screws 41 and 42 and locknuts 43 and 44 for mounting thereon.

An index block 45 is mounted on the inch wheel 16 and is adapted to engage the transfer pinion 39 once during each revolution in a manner to be described subsequently in conjunction with FIGURES 6 and 7.

A solenoid 46 is also shown in FIGURE 1 mounted on the inner plate 13 for actuating a gear stop assembly 47 which will be described in more detail in conjunction with FIGURES 2, 3 and 4.

The outer plate 26 mounts the micro switches 51 and 52 having roller actuators 53 and 54 in contact with the high and low cams 55 and 56, which are mounted on the shaft 25 connected to the foot gear wheel 27 and are adapted to provide a warning indication of high and low levels in the tank back to the control station by suitable connections (not shown).

The outer plate 26 also mounts a stepping motor 57 on a mounting plate 58 supported by a plurality of spacers such as the one shown at 59. The stepping motor 57 drives a small spur gear 61 which engages a larger gear and hub 62 having a pair of scanning brushes 63 and 64 which contact conductive segments and a conductive ring on the commutator disc 65.

The outer plate 26 further mounts the two relays 66 and 67 which serve a purpose in the operation of the level encoder to be described infra in conjunction with the operation of the encoder.

Figure 2:
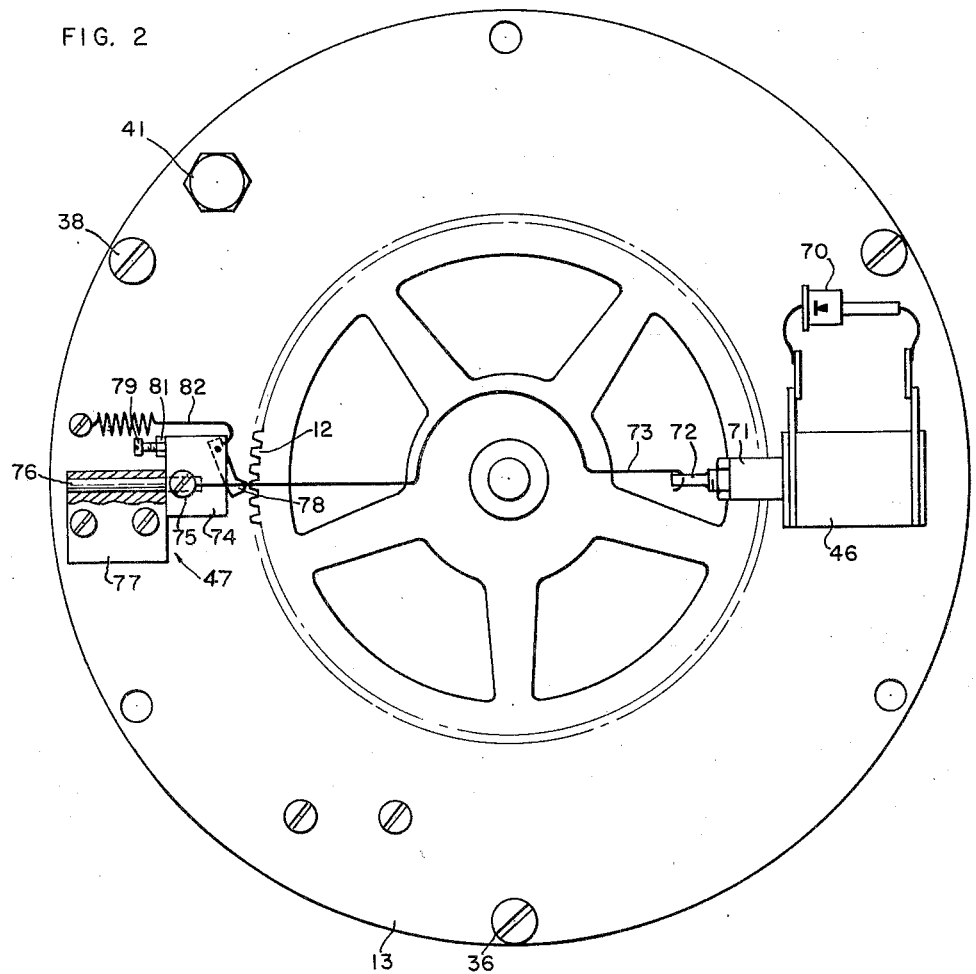
FIGURE 2 is a right side view showing the inner plate assembly and illustrating the locking mechanism.
Figure 3:
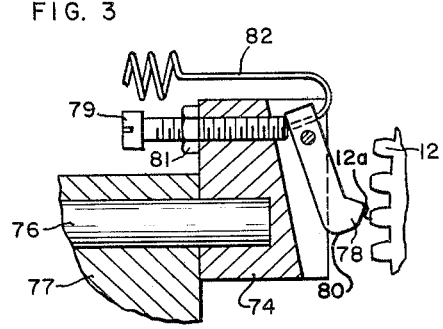
FIGURE 3 is an enlarged detail view in section showing the gear stop mechanism in one position prior to engagement with the gear wheel.
Figure 4:
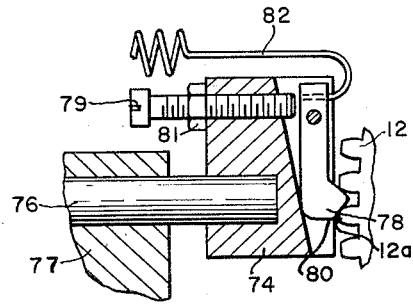
FIGURE 4 is a detail view similar to FIGURE 3 and illustrating the gear stop mechanism engaging the gear wheel to move the inch disc into the proper position.
Figure 5:
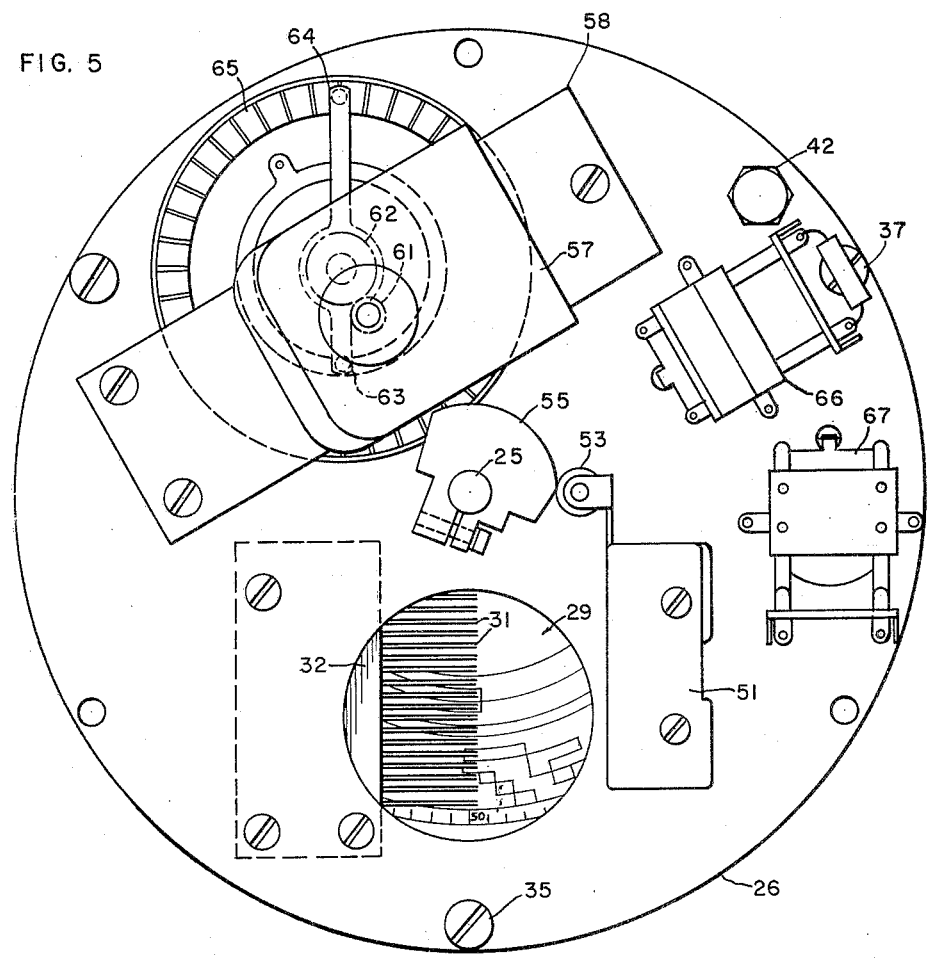
FIGURE 5 is a left side view showing the outer plate assembly and illustrating the stepping motor with the commutator disc and scanning brush, as well as other details of construction.

Referring now more particularly to the FIGURES 2, 3 and 4, the locking mechanism is illustrated in detail. The solenoid 46 has a diode 70 connected across its terminals to provide a unidirectional or D.C. current therethrough and actuates an armature 71 having a spade bolt 72 connected thereto for connection to the actuating wire 73 which in turn is connected to a housing 74 by a machine screw 75 which also secures the guide shaft 76 in position within the housing 74.

The guide shaft 76 is adapted to slide or reciprocate in a suitable bore in the guide housing 77 to move the gear stop 78 into and out of engagement with the teeth on the gear 12. The gear stop 78 is pivotally mounted in a suitable inclined recess in the housing 74 which is provided with an adjustable stop 79 retained in its proper position by a locknut 81 and engaging the end of the gear stop 78, as shown in FIGURE 3, when the spring 82 exerts a tension on the gear stop 78.

It will be apparent that if the solenoid 46 is actuated with the gear stop 78 in the position shown in FIGURE 3 relative to the teeth of the gear 12 that a cam 80 on the gear stop 78 will contact the face of one of the teeth on the gear 12 and move the gear slightly to the position shown in FIGURE 4 where the brushes 21 on the brush block 19 will be properly positioned with respect to the coded segments on the commutator surface 18 to provide an accurate, correct and unambiguous indication of the position of the inch wheel 16.

If, however, the gear 12 should stop in a position where the cam 80 on the gear stop 78 should contact the flat outer end 12a of one of the teeth on the gear 12, it will be apparent that the cam 80 on the gear stop 78 will force the tooth to move in a direction depending upon which half of the flat outer end 12a it contacts. If it happens on the uppermost half, then it will force the gear 12 to move counterclockwise or back up to a position of nonambiguity. If the cam contacts the flat outer end 12a on the lower half, then it will force the gear to rotate clockwise, or forward. The gear stop 78 is pivotally mounted to protrude the cam 80 toward the gear 12. The angle at which it protrudes determines where the sam 80 first makes contact with the flat outer end 12a of the gear 12. If the angle at which it first makes contact is not correct to correspond to where the brushes 21 are on a particular segment of the coded commutator section 18, then an error of more than one-half bit might be introduced into the encoder. This error can be corrected by changing the angle at which the cam 80 of the gear stop 78 first contacts the end 12a of the gear 12. This can be accomplished by adjusting the adjustable stop 79. If the adjustable 79 is screwed in, then the angle of the gear stop 78 is decreased and if it is screwed out, the angle is increased.

The transfer mechanism between the inch wheel 16 and the foot gear wheel 27 is illustrated in FIGURE 1 and in the detail views of FIGURES 6 and 7. It will be apparent that when the index block 45 mounted on the inch wheel 16 passes by the transfer pinion 39 that the transfer teeth 83 and 84 will engage the teeth on the transfer pinion and rotate the pinion 39 through an angle of 120° which will correspond to two teeth on the foot gear wheel 27 and one increment on the coded commutator surface 29.

If the inch wheel 16 is considered to be moving counterclockwise with the index block 45 moving down in the position shown in FIGURE 7, it will be apparent that the transfer tooth 83 on the index block 45 will first engage one of the teeth 85 on the transfer pinion 39 rotating the transfer pinion in a clockwise direction, with the tooth 86 next coming between the transfer teeth 83 and 84, as shown in FIGURE 6. In the next step (not shown) the transfer tooth 84 will move the tooth 86 down leaving the tooth 87 in radial position to be engaged on the next pass and leaving the teeth 86 and 88 in contact with the periphery of the inch wheel 16, so that the transfer pinion cannot rotate again until it is next contacted or engaged by the transfer teeth 83 and 84 on the index block 45.

It should be noted in FIGURE 1 that alternate teeth such as the teeth 85, 87 and 89 are cut away on the right hand portion of the transfer pinion so that these teeth will not interfere with the periphery of the inch wheel 16 and only the alternate teeth 86, 88 and 90, which are shown in section in FIGURES 6 and 7, will engage the periphery of the inch wheel in the manner illustrated.

Operation

In the operation of the level encoder representing one preferred embodiment of the present invention, as shown herein, a series of pulses are received from the central electrical control station by suitable connections (not shown), when it is desired to interrogate the level encoder, and these pulses are differentiated for driving the stepping motor 57. The first five pulses will provide an identification which will only actuate one particular encoder at a specific location, and one of these identification pulses will actuate the relay 66 for locking in the solenoid 46 and holding the locking mechanism until the scanning of the readout brushes 21 and 31 is completed. This relay 66 will then be released by grounding the relay 66 during the subsequent contact of the brush 64 with a segment on the commutator 65 near the end of the message or the latter part of the scanning sequence.

After the five coded pulses for identification, the subsequent positions of the brush 64 on the segments of the commutator 65, as driven by the stepping motor 57, will interrogate or connect each of the brushes 21 and 31 sequentially to provide a zero or one indication by the presence or absence of a voltage to provide a digital indication of the position of the input shaft 11.

The last five positions of the brush 64 on the commutator 65 transmits five zeros which indicate the end of the message, and one of these segments is connected to the relay 66 for grounding the relay and releasing the solenoid 46. The next to last position actuates the relay 67 for disconnecting the stepping motor from the control station and after a certain delay which indicates to the control station that the cycle is completed, the relay also provides a pulse to the stepping motor 57 which moves it to the home or zero position.

It will be apparent that the novel and basic concepts of the present invention have many other applications for digital encoding of a shaft position other than the specific application illustrated herein, and the coded disc 16 and the coded gear wheel 27 can obviously be coded in other systems of measurement than the feet, inches and sixteenths of an inch, as indicated in the present application of the encoder to measuring the depth of a liquid in a storage tank.

Obviously, many other modifications and variations of the present invention may be made within the scope of the following claim.

What is claimed is:

An analog-to-digital encoder comprising:
(A) an input shaft,
(B) a gear wheel mounted on said input shaft,
(C) a coded disc mounted on said input shaft,
(D) a coded gear wheel mounted for rotation adjacent and concentric with said coded disc,
(E) a transfer pinion mounted for rotation in engagement with the wheel on the periphery of said gear wheel and with alternate teeth positioned to engage the periphery of said coded disc,
(F) an index block on said coded disc having at least one transfer tooth adapted to engage the wheel on said transfer pinion and rotate said coded wheel by one increment for each complete revolution of said coded disc,
(G) a brush block positioned adjacent the surface of each of said coded disc and coded gear wheel and having the plurality of brushes adapted to contact the coded surface,
(H) a locking mechanism mounted adjacent said gear and adapted to be actuated for engagement with the teeth on said gear for moving said gear and said coded disc to a position where said brushes are correctly positioned with respect to the code to provide an accurate and unambiguous readout from said disc and gear wheel coded surface having:

(1) a slidable guide shaft,
(2) a guide housing adapted to receive said guide shaft and mounted adjacent said gear wheel,
(3) a solenoid adapted to actuate said guide shaft horizontally in said guide housing,
(4) a gear stop housing affixed to said guide shaft and having an inclined recess therein,
(5) a gear stop pivotally mounted in said inclined recess of said gear stop housing and adapted to engage the teeth of said gear wheel when positioned therewith by said guide shaft,
(6) means biasing said pivoted gear stop toward said teeth of said gear wheel, and
(7) a gear stop adjustment adapted to adjust the angle of said gear stop toward said teeth of said gear wheel,
(I) a stepping motor adapted to receive a series of input pulses and provided with an output shaft having scanning brushes connected thereto,
(J) a commutator positioned adjacent said scanning brushes and having a plurality of segments connected sequentially to said readout brushes for sequential scanning of said readout brushes to provide a digital code indicative of the position of said input shaft,
(K) a shaft connected to said coded gear wheel and provided with a pair of high and low cams, and
(L) a pair of microswitches having roller actuators adapted to engage said high and low cams respectively for providing an indication of high and low limits of said input shaft position.

References Cited in the file of this patent
UNITED STATES PATENTS

| | | |
|---|---|---|
| 2,867,796 | Kendall | Jan. 6, 1959 |
| 2,923,825 | Dickinson | Feb. 2, 1960 |